Patented July 15, 1924.

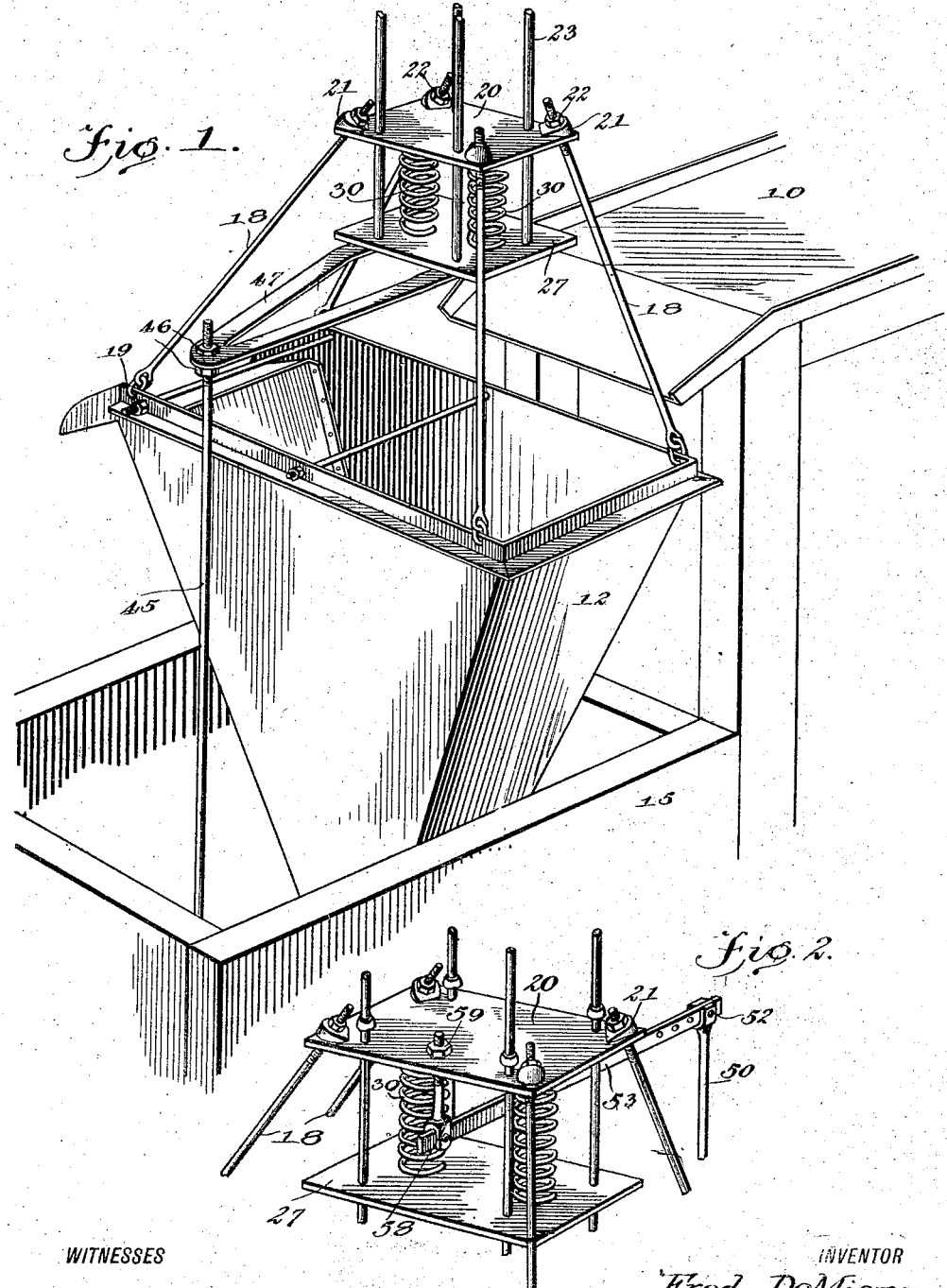

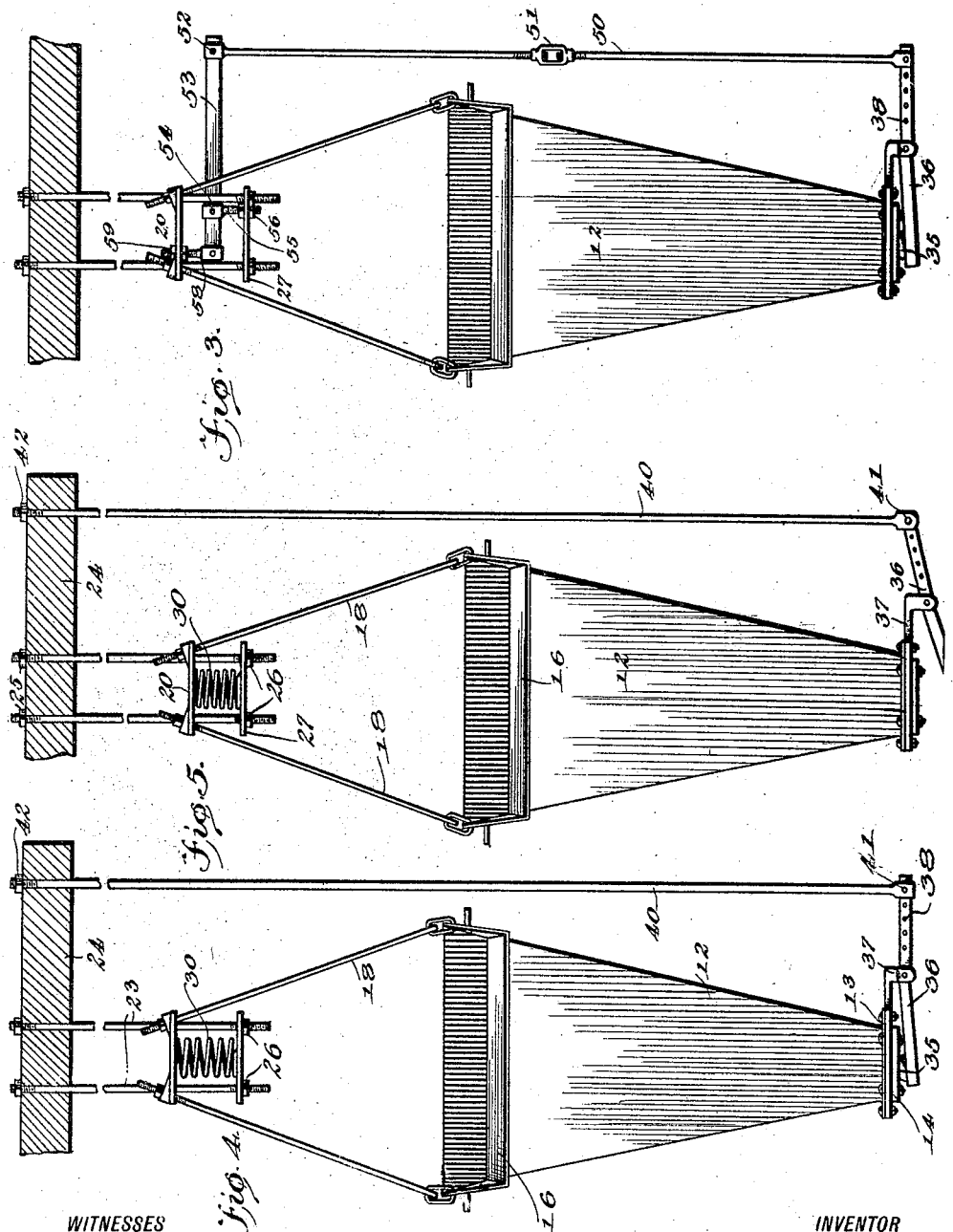

1,501,204

UNITED STATES PATENT OFFICE.

FRED DE MIER, OF PICHER, OKLAHOMA.

CLASSIFYING APPARATUS.

Application filed March 7, 1923. Serial No. 623,515.

*To all whom it may concern:*

Be it known that I, FRED DE MIER, a citizen of the United States, and a resident of Picher, in the county of Ottawa and State of Oklahoma, have invented certain new and useful Improvements in Classifying Apparatus, of which the following is a specification.

This invention relates in general to classifiers for use with ore or the like, and more particularly to a dewatering and classifying cone or receptacle of this character wherein the sand and solid material is maintained at a predetermined level in the receptacle by the action of a valve arranged exteriorly of the receptacle and automatically operated in an improved manner so as to periodically permit of discharge of the solid matter from the receptacle whereby to maintain the proper level.

Another object is to provide an apparatus of this character which is of simple and durable construction, reliable in operation and easy and comparatively inexpensive to manufacture.

Other objects and advantages of the invention reside in certain novel features of the construction, combination and arrangement of parts which will be hereinafter more fully described and particularly pointed out in the appended claims, reference being had to the accompanying drawings forming part of this specification, and in which:

Figure 1 is a perspective view, illustrating one embodiment of the invention;

Figure 2 is a fragmentary perspective view, showing a slightly modified form of upright mechanism for the discharge valve;

Figure 3 is a view in side elevation of the embodiment shown in Figure 2;

Figure 4 is a view similar to Figure 3 but showing another form of valve operating mechanism; and Figure 5 is a view similar to Figure 4 but showing the valve operating mechanism positioned to open the discharge valve.

Referring to the drawings it is to be understood that with all embodiments of the invention there is preferably employed a launder 10 through which the water and sand and other material flows. At the delivery end of the launder a dewatering or classifying cone or receptacle 12 is arranged and of course receives the water and sand or other material from the launder 10. This receptacle 12 may be in the form of an inverted pyramid as shown in the drawings or if desired it may be in the form of an inverted cone and at its lower end it has secured thereto plates 13 and 14 which are provided with openings constituting the discharge outlet of the receptacle of solid material such as sand, crushed ore or the like. The material which flows through the discharge outlet is preferably received in a tank 15 or the like arranged below the receptacle 12. At its upper end and to one side, the receptacle 12 is provided with an outlet 16 arranged to discharge clear of the tank 15 so that the water which flows through the outlet 16 is separated from the solid material contained in the tank 15.

The receptacle 12 is supported by a plurality of rods 18, the lower ends of which are connected by links 19 to the receptacle and the upper ends of which are threaded and extend through openings provided therefor in a carrier plate 20. The carrier plate 20 is provided with four lugs 21 one for each rod 18 and these lugs 21 are of course apertured so that the rods 18 extend through the lugs as well as through the carrier plate and nuts 22 are threaded on the lower ends of the rods 18 and engage the upper inclined faces of the lugs 21 to adjustably secure the rods 18 to the carrier plate. This carrier plate 20 is provided with a number of guide openings through which supporting rods 23 slidably extend. These supporting rods 23 depend from any suitable stationary supporting structure, such as a beam 24, as shown in Figures 3 to 5, inclusive, and are preferably supported upon the beams by means of nuts 25 threaded on the ends of the rod 23. The lower ends of the rods 23 have secured thereto by means of nuts 26 a fixed supporting plate 27, the supporting rods 23 extending through openings provided in the fixed supporting plate 27 and the lower ends of the rods having the nuts 26 threaded thereon and engaging the lower side of the supporting plate 27 to hold the same in position. Between the plates 20 and 27 any desired number of compression coil springs 30 are placed, the lower ends of the coil springs engaging the plate 27 and the upper ends engaging the carrier plate 20. In this manner the receptacle 20 is resiliently maintained in position but when a predetermined amount of solid matter such as sand or crushed ore accumulates in the receptacle 12 the weight thereof will serve to move the carrier plate 20 downwardly against the tension of the coil springs 30. The receptacle 12 thus moves relatively to its support and it is this movement of the receptacle that is utilized for operating the valve controlling the discharge opening for the sand and crushed ore as will be hereinafter more fully described.

The discharge valve which controls the flow of the sand or other solid material through the discharge port formed in the plates 13 and 14 is designated at 35 and preferably is in the form of a semisphere. This valve is carried at one end of a valve arm 36 pivoted intermediate its ends upon a bracket 37 carried by the plate 13. The portion of the arm which lies on the opposite side of the bracket from the valve 35 is connected with the means for operating the valve and for this purpose it is provided with a series of openings 38. In the form of the invention shown in Figures 4 and 5 this operating means consists simply of a valve operating rod 40 the lower end of which is pivotally connected, as at 41 to any one of the openings 48 in the arm 37 and the upper end of which is connected by means of a nut 42 with the supporting beam 24. With this form of the invention the valve 35 is maintained closed until a predetermined amount of sand or other solid material accumulates in the receptacle 12 whereupon the weight of such solid material will be sufficient to compress the springs 30 thus moving the receptacle 12 downwardly relative to its supporting structure including the beam 24. Since the rod 40 is supported upon and depends from the beam 24 the downward movement of the receptacle 12 will push the valve arm 36 downwardly at its connection to the bracket 37 and this movement will swing the arm 36 to the position shown in Figure 5 to open the valve and permit discharge of the solid materials from the receptacle 12. When the discharge of the solid material has progressed to the desired extent the weight of course will be correspondingly decreased and eventually the springs 30 will overcome the weight of the receptacle so as to move the same upwardly. The bracket 37 moves upwardly with the receptacle and elevates the arm 36 to bring the same to such position as to cause the valve 35 to move to the position shown in Figure 4.

In the form of the invention shown in Figure 1 the rod which corresponds to the rod 40 is shown at 45 and is connected with the discharge valve in the same manner as the rod 40. In lieu of supporting this rod 45 upon the beam 24 it is adjustably connected by means of nuts 46 to the outer end of a yoke 47 which extends laterally from the supporting plate 27. This yoke 47 is supported upon the plate 27 or it may be supported on the rods 23, the arms of the yoke having openings through which the lower end of the arms 23 extend and with this arrangement the same nuts 26 which serve to hold the supporting plate 27 on the rods 23 may also serve to hold the yoke on these rods. The operation of this form of the invention is precisely the same as that shown in Figures 4 and 5, the only difference being the manner of holding the rods 40 and 45.

In the form of the invention shown in Figures 2 and 3 the valve operating rod which corresponds to the rod 40 and 45 is designated at 50 and is provided with the turn buckle 51 so that it is adjustable as to length. In lieu of connecting the upper end of this rod 50 to the supporting structure it is pivotally connected, as at 52, to the outer end of the rock lever 53. Intermediate its ends and preferably adjacent one end the lever 53 is pivotally mounted, as at 54 on a fulcrum 55, the shank of which is threaded and is held in vertically adjustable position by means of nuts 56 arranged on the opposite side of the supporting plate 27 through the opening of which the shank of the fulcrum extends. The end of the rock lever 53 which is opposite to the connection 52 to the operating rod 50 is pivotally connected to a link 58 similar in structure to the fulcrum 55 but serving to connect the rock lever 53 to the sliding carrier plate 20, the shank of the link 58 extending through an opening provided therefor in the plate 20 and being connected to said plate by nuts 59.

With this form of the invention when the solid matter has accumulated in the receptacle 12 at a point at which the discharge is to occur, the receptacle 12 will move downwardly, as before and of course the carrier plate 20 will partake of the motion of the receptacle 12. This motion of the carrier plate which of course is relative to the supporting plate 27 rocks the lever 50 on its fulcrum 55 by virtue of the connection of the carrier plate with the rock lever through the link 58. Upon movement of the rock lever 53 the valve 35 is opened or closed as the case may be since the rock lever is connected with the arm 36 of the valve through the operating rod 50.

In all embodiments of the invention it will be noted that the valve is arranged exteriorly of the receptacle and because of its form and the manner in which it is operated it will readily come to closed position to prevent discharge when desired. The operating mechanism of the valve is also arranged exteriorly of the tank and although simple is positive in its action both in respect of the opening and closing of the valve.

I claim:

1. In combination, a receptacle, means for resiliently supporting the receptacle including supporting rods, a fixed supporting plate carried thereby, a carrier plate slidably mounted on the supporting rods, connecting means between the carrier plate and the receptacle, spring means between the carrier plate and fixed supporting plate for maintaining the carrier plate and consequently the receptacle in predetermined position, said receptacle having a discharge outlet and a valve controlling said outlet and an arm carried by said valve, a bracket mounted on the receptacle and pivotally supporting said arm, and operating means for said valve including a yoke carried by the fixed supporting plate and a rod connected at one end to said yoke and at its other end to said operating arm.

2. In combination, a receptacle, means for resiliently supporting the receptacle in predetermined position including a plurality of supporting rods, a supporting plate carried by said rods, a carrier slidably mounted on the rods, connecting means between the carrier and the receptacle, yieldable means between the fixed supporting plate and the carrier for maintaining the receptacle in predetermined position, said receptacle having a discharge outlet, a valve controlling said outlet and means utilizing the movement between the carrier plate and the fixed supporting plate for operating said valve.

3. In combination, a receptacle, means for yieldably supporting the receptacle in predetermined position including a plurality of supporting rods, a supporting plate carried by said rods, a carrier slidably mounted on the rods, connecting means between the carrier and the receptacle, yieldable means between the supporting plate and the carrier for maintaining the receptacle in predetermined position, said receptacle having a discharge outlet, a valve controlling said outlet, and means for operating said valve.

FRED DE MIER.